United States Patent
Abershitz (10) Patent No.: US 8,905,358 B2
(45) Date of Patent: Dec. 9, 2014

(54) UNMANNED AERIAL VEHICLE HAVING AN IMPROVED AERODYNAMIC CONFIGURATION

(75) Inventor: Abraham Abershitz, Netanya (IL)

(73) Assignee: Israel Aerospace Industries Ltd., Lod (IL)

( * ) Notice: Subject to any disclaimer, the term of this patent is extended or adjusted under 35 U.S.C. 154(b) by 511 days.

(21) Appl. No.: 13/140,233

(22) PCT Filed: Dec. 1, 2009

(86) PCT No.: PCT/IL2009/001128
§ 371 (c)(1),
(2), (4) Date: Jun. 16, 2011

(87) PCT Pub. No.: WO2010/070631
PCT Pub. Date: Jun. 24, 2010

(65) Prior Publication Data
US 2011/0248123 A1    Oct. 13, 2011

(30) Foreign Application Priority Data
Dec. 16, 2008    (IL) .......................................... 195977

(51) Int. Cl.
*B64C 3/58*    (2006.01)
*B64C 39/10*    (2006.01)
*B64C 39/00*    (2006.01)
*B64C 39/02*    (2006.01)

(52) U.S. Cl.
CPC ......... *B64C 39/024* (2013.01); *B64C 2201/042* (2013.01); *B64C 2201/127* (2013.01); *B64C 2201/028* (2013.01); *B64C 39/028* (2013.01); *B64C 2201/165* (2013.01)
USPC .......... 244/199.4; 244/76 C; 244/190; 244/13

(58) Field of Classification Search
CPC ................ B64C 3/58; B64C 2201/021; B64C 2201/104; B64C 2203/00; B64C 23/065
USPC ........... 244/13, 76 C, 190, 199.4; 446/34, 56, 446/57
See application file for complete search history.

(56) References Cited

U.S. PATENT DOCUMENTS 1,987,050 A    1/1935    Burnelli
2,439,048 A    4/1948    Korff
(Continued)

FOREIGN PATENT DOCUMENTS

EP              1 666 356 A1    6/2006
WO    WO 2005/025983 A1    3/2005
WO    WO 2006/059324 A1 *    6/2006    ................ B64C 9/18

OTHER PUBLICATIONS

"IAI reveals details of Micro UAV," *Flight International*, 2004, vol. 165, No. 4927, p. 15, XP001190221.

*Primary Examiner* — Rob Swiatek
(74) *Attorney, Agent, or Firm* — Oliff PLC (57) ABSTRACT

An unmanned air vehicle includes a body having front and rear sections with at least one pair of end plates connected to the body, wherein one end plate within the at least one pair of end plates is connected to the left side of the body and another end plate within the at least one pair of end plates is connected to the right side of the body, each end plate having upper and lower sections, wherein: a) the upper section is positioned above a mean line of the body; b) the lower section is positioned below the mean line of the body; and c) a ratio of the area of the upper section to the area of the lower section is less than 1.

34 Claims, 8 Drawing Sheets

(56) References Cited

U.S. PATENT DOCUMENTS

| | | | |
|---|---|---|---|
| 3,761,041 A * | 9/1973 | Putman | 244/13 |
| 4,714,215 A * | 12/1987 | Jupp et al. | 244/199.4 |
| 5,240,207 A * | 8/1993 | Eiband et al. | 244/190 |
| 5,890,441 A | 4/1999 | Swinson et al. | |
| 6,565,041 B1 * | 5/2003 | Young et al. | 244/139 |
| 6,626,397 B2 * | 9/2003 | Yifrach | 244/35 R |
| 2007/0029440 A1 | 2/2007 | Shepshelovich et al. | |
| 2007/0246601 A1 | 10/2007 | Layton | |

\* cited by examiner

UNMANNED AERIAL VEHICLE HAVING AN IMPROVED AERODYNAMIC CONFIGURATION

FIELD OF THE INVENTION

The present invention relates to unmanned aerial vehicles. More particularly, the present invention relates to providing an unmanned micro aerial vehicle (MAV) having an improved aerodynamic configuration.

DEFINITIONS, ACRONYMS AND ABBREVIATIONS

Throughout this specification, the following definitions are employed:

Aspect Ratio (AR): In aerodynamics, the aspect ratio is defined as wingspan in a square divided by the wing area. Generally, a high aspect ratio indicates long, narrow wings, and a low aspect ratio indicates short, stubby wings.

Drag force: is a mechanical force, generated by the interaction and contact of a solid object with a fluid (i.e., liquid or gas) due to the difference in velocities between the solid object and the fluid.

Lift force: is a mechanical force generated by a solid object as it moves through a fluid. Lift force is the sum of all the fluid dynamic forces on the solid object perpendicular to the direction of the external flow approaching that solid object. Lift force is generated when the solid object turns a fluid away from its direction of flow.

MAV: is an acronym for Micro (Unmanned) Aerial Vehicle (see UAV). Compared to UAV, it is a relatively small air vehicle.

Mean Line: a line which stays equidistant from the top and bottom surfaces (sides) of an aircraft body (the aircraft body can be, for example, a flying wing).

Pitch axis: In flight, any aircraft rotates about its center of gravity, a point which is the average location of the mass of the aircraft. The pitch axis is perpendicular to the aircraft centerline and lies in the plane of the wings. A pitch motion is an up or down movement of the nose (front section) of the aircraft around the pitch axis.

Reynolds number: is the ratio of inertial forces to viscous forces, and consequently it quantifies the relative importance of these two types of forces for given flow conditions. It is also used to identify and predict different flow regimes, such as laminar or turbulent flow. Laminar flow occurs at low Reynolds numbers, where viscous forces are dominant, and is characterized by smooth, constant fluid motion, while turbulent flow, on the other hand, occurs at high Reynolds numbers and is dominated by inertial forces, which tend to produce random eddies, vortices and other flow fluctuations.

Roll axis: In flight, any aircraft rotates about its center of gravity, a point which is the average location of the mass of the aircraft. The roll axis lies along the aircraft centerline. A roll motion is an up and down movement of the wings of the aircraft around the roll axis.

Yaw axis: In flight, any aircraft rotates about its center of gravity, a point which is the average location of the mass of the aircraft. The yaw axis is perpendicular to the wings and lies in the plane of the aircraft centerline. A yaw motion is a side to side movement of the aircraft.

UAV: is an acronym for Unmanned Aerial Vehicle that is remotely controlled or autonomous aircraft used for various purposes, such as surveillance, army strike mission, police, etc.

BACKGROUND OF THE INVENTION

Recently, development of Micro Aerial Vehicles (MAVs) around the world has been delayed due to limited understandings of the aerodynamics of small aircraft that fly at relatively low speed. Classical aerodynamic theory can provide relatively accurate performance predictions for an aircraft flying at Reynolds numbers larger than approximately one million. However, the emergence of providing remotely piloted vehicles for military surveillance missions during the late seventies led to an increase in research of lower Reynolds numbers aerodynamics (in the range below 500,000).

In the last several years, Micro Aerial Vehicles (MAVs) have formed a new area of aeronautical research. This type of unmanned aircraft is usually defined by take-off weights of typically less than 500 gram and very small dimensions, leading to wingspans smaller than 50 centimeters. Micro Aerial Vehicles operate at significantly low speeds, and their Reynolds numbers range is about 150,000 and lower. The need in providing an efficient MAV (Micro Aerial Vehicle) has recently increased due to a dramatically increasing demand in developing a very small intelligent unmanned air-vehicle for military, police and civilian purposes. Such air-vehicles would be intended to fly over an area of interest, within a few minutes of a user's request, gathering vital real-time information that can be crucial, for example, to the success of police or military missions. In addition, the use of utilizing miniaturized electronics, such as MEMS (Micro-electro-mechanical systems), makes it feasible to develop a relatively inexpensive, small and light weight MAV.

Usually, a MAV carries a photo/video camera that is fixed to its aircraft body. By means of this camera, the MAV takes photos and/or shoots video films of the area of interest, above which said MAV is flying. According to the prior art, due to the longitudinal instability of a MAV, the videos/images that are transmitted to a ground control station to be displayed on a computer screen, usually shake to such a degree that they are often useless to the user since no sufficient visual information can be understood. Therefore, the whole concept of developing the MAV may be meaningless, unless the quality of the videos/images that are transmitted to a remote user is relatively good. The above instability problems can further arise because of the low inertia and low weight of the MAV. In addition, due to the fact that a MAV operates at low Reynolds numbers, special attention can be devoted to providing an efficient airfoil configuration of the MAV.

Figure 1A:
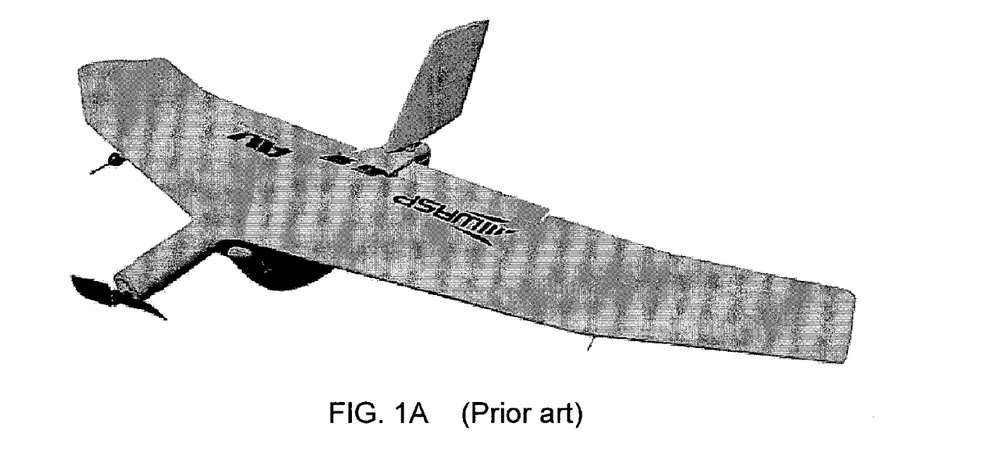
FIG. 1A to FIG. 1D are illustrations of prior art unmanned air vehicles.
Figure 1B:
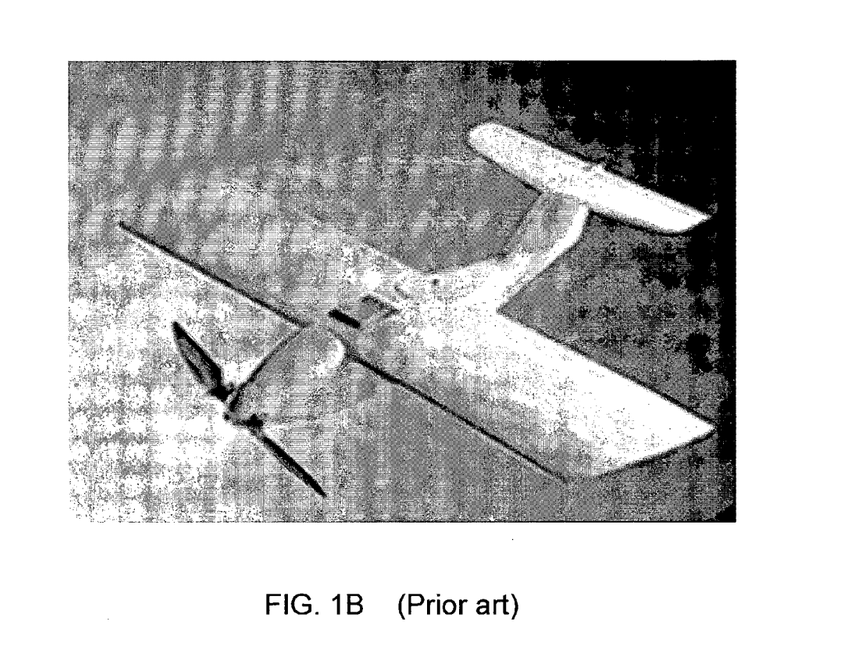

The MAV instability problems have been recognized in the prior art and various MAV configurations have been proposed to provide a solution. For example, BATMAV™ (Wasp III) presented on FIG. 1A is a light weight MAV that weights about 450 gram [g] and has a wingspan of 42 centimeters [cm]. BATMAV™ has been developed by AeroVironment Inc. that is located in the United States. BATMAV™ is a relatively small, electrically powered unmanned aerial vehicle, which is equipped with forward and side-looking color video cameras, as well as a modular forward or side-looking electo-optical infrared payload. BATMAV™ has rechargeable lithium ion batteries, and it can fly for about 45 minutes, without recharging said batteries. CAROLO™ P50 is another small and light weight MAV as illustrated in FIG. 1B, has a wingspan of 50 [cm] and mass of 550 [g]. CAROLO™ P50 has been developed by Mavionics GmbH company, located in Germany. CAROLO™ P50 can fly, without recharging its batteries, for about 30 minutes.

Figure 1C:
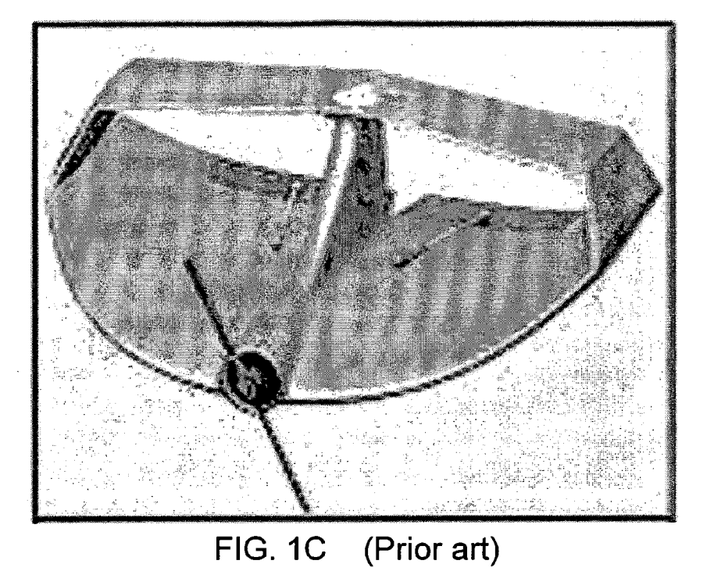
Figure 1D:
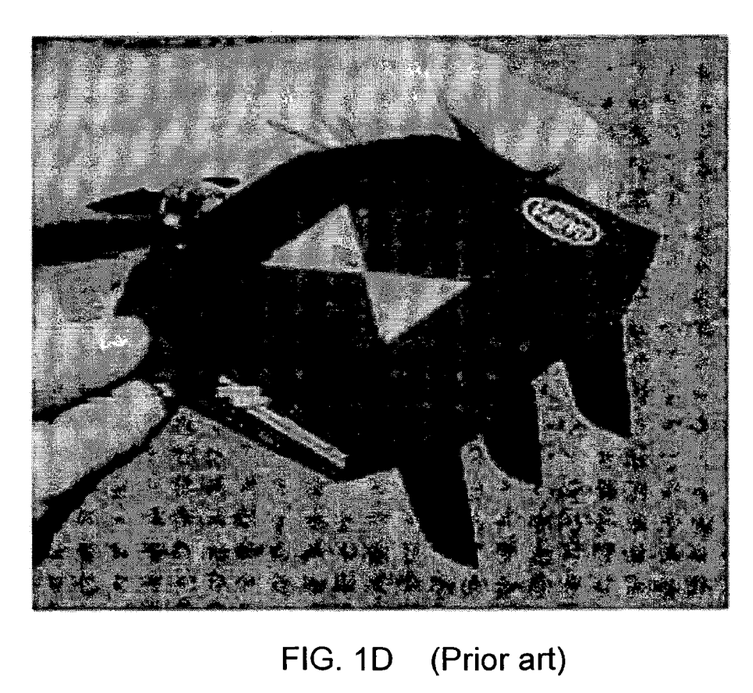

MIRADOR™ is still another small and light weight MAV as shown in FIG. 1C, having a wingspan of 50 [cm] and a mass of more than 500 [g]. MIRADOR™ has been developed by the ONERA defense aerospace research laboratory, located in France. MIRADOR™ can fly, without recharging its batteries, for about 30 minutes. BLACK WIDOW™ is a further small and light weight MAV, which has a mass of only 50 [g]. The BLACK WIDOW™ has been developed by AeroVironment Inc. (located in the United States), and is designed in a circular platform, as illustrated in FIG. 1D. The BLACK WIDOW™ is powered by an electric motor that accelerates it to a maximum flight speed of 20 m/sec [meters per second]. In addition, the BLACK WIDOW™ can fly, without recharging its batteries, for about 30 minutes; it has a flight range of 17 kilometers at cruising airspeeds between 38 to 53 km/h [kilometers per hour].

US 2007/0029440 discloses an aircraft arrangement for mini or micro UAV comprising a fore wing and an aft wing in tandem closed-coupled arrangement. The aft wing has side panels and control surfaces, and tapered platform with positive sweep, while the fore wing has non-positive trailing edge sweep. The fore wing and the aft wing are disposed at different heights, and the aircraft arrangement has no other wings or tail arrangements.

U.S. Pat. No. 1,987,050 relates to a tailless airplane comprising a continuous wing having a central section with plural engines at its entering edge, said section at cruising and high speeds providing the major lift, and fixed, lateral, swept back stabilizing sections whose centre of pressure is located rearwardly of the centre of pressure of the central section.

U.S. Pat. No. 5,890,441 presents a semi-autonomously directed, autonomously controlled, gyroscopically stabilized, horizontal or vertical take off and landing flying apparatus employing two vertical lift devices equally and longitudinally spaced from the center of gravity of the apparatus; continuously integrated with a drive train apparatus, optional single or multiple power means; congruously connected thereto horizontal thrust devices.

There is a continuous need in the art to provide a MAV, which is relatively stable, especially along its roll (longitudinal) and yaw axes, and has an improved aerodynamic configuration. Also, there is a need to utilize aircraft end plates (connected to both sides of the aircraft) in an effective manner for achieving its stability during the flight and efficiently reducing the induced drag force. In addition, there is a need in the art to overcome vibrations and oscillations along aircraft roll and yaw axes, when the aircraft speed increases, by substantially preventing airflow from a bottom side of an aircraft body to a top side of said body. Further, there is a need to enable shooting relatively stable video scenes and taking relatively stable photos during the aircraft flight by means of an on-board camera.

SUMMARY OF THE INVENTION

The present invention relates to providing an unmanned micro aerial vehicle (MAV) having an improved aerodynamic configuration.

The unmanned air vehicle comprises a body having front and rear sections with at least one pair of end plates connected to said body, wherein one end plate within said at least one pair of end plates is connected to the left side of said body and another end plate within said at least one pair of end plates is connected to the right side of said body, each end plate having upper and lower sections, wherein:
  a) said upper section is positioned above a mean line of said body;
  b) said lower section is positioned below said mean line of said body; and
  c) a ratio of the area of said upper section to the area of said lower section is less than 1.

According to an embodiment of the present invention, the ratio of the area of said upper section to the area of said lower section is substantially less than 1.

According to another embodiment of the present invention, the ratio of the area of said upper section to the area of said lower section is between 0.05 and 0.55.

According to a particular embodiment of the present invention, the ratio of the area of said upper section to the area of said lower section is 0.176.

According to an embodiment of the present invention, the end plates stabilize said unmanned air vehicle along its roll axis.

According to another embodiment of the present invention, the end plates stabilize said unmanned air vehicle along its yaw axis.

According to still another embodiment of the present invention, the unmanned air vehicle is selected from one of the following: (a) a micro air vehicle; (b) a mini air vehicle; and (c) a nano air vehicle.

According to still another embodiment of the present invention, the end plate has one of the following forms, or a combination thereof: (a) inverse Zimmerman; (b) Zimmerman; (c) rectangular; (d) square; (e) elliptical; (f) trapezoidal; (g) triangular; and (h) parabolic.

According to a further embodiment of the present invention, each end plate is substantially vertically connected to the body.

According to still a further embodiment of the present invention, each end plate is tilted relative to the body.

According to an embodiment of the present invention, the body of said unmanned air vehicle has a form of a flying wing.

According to another embodiment of the present invention, the body has an airfoil shape.

According to still another embodiment of the present invention, the unmanned air vehicle is tailless.

According to a particular embodiment of the present invention, the thickness of the body decreases from its front section toward its rear section.

According to an embodiment of the present invention, a propulsion system is provided at the front section of the body.

According to another embodiment of the present invention, the unmanned air vehicle further comprises a photo and/or video camera.

According to still another embodiment of the present invention, the camera is one or more of the following: (a) an optical camera; (b) an infrared or near-infrared camera; and (c) an ultraviolet camera.

According to a particular embodiment of the present invention, the unmanned air vehicle further comprises one or more control panels.

According to another particular embodiment of the present invention, the one or more control panels are located at the rear section of the body of the unmanned air vehicle.

According to an embodiment of the present invention, the one or more control panels are simultaneously deflected by means of a control unit.

According to another embodiment of the present invention, two or more control panels are simultaneously deflected up or down.

According to still another embodiment of the present invention, the one control panel is deflected up simultaneously when another control panel is deflected down.

According to an embodiment of the present invention, at least one end plate is connected to the rear section of the body of the unmanned air vehicle.

According to another embodiment of the present invention, the unmanned air vehicle further comprises a control unit for controlling operation of said unmanned air vehicle.

According to still another embodiment of the present invention, the unmanned air vehicle further comprises a power system having one or more batteries or accumulators.

BRIEF DESCRIPTION OF THE DRAWINGS

In order to understand the invention and to see how it may be carried out in practice, various embodiments will now be described, by way of non-limiting examples only, with reference to the accompanying drawings, in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE EMBODIMENTS

In the following detailed description, numerous specific details are set forth in order to provide a thorough understanding of the invention. However, it will be understood by those skilled in the art that the present invention may be practiced without these specific details. In other instances, well-known methods, systems, procedures, components, circuits and the like have not been described in detail so as not to obscure the present invention.

Figure 2A:
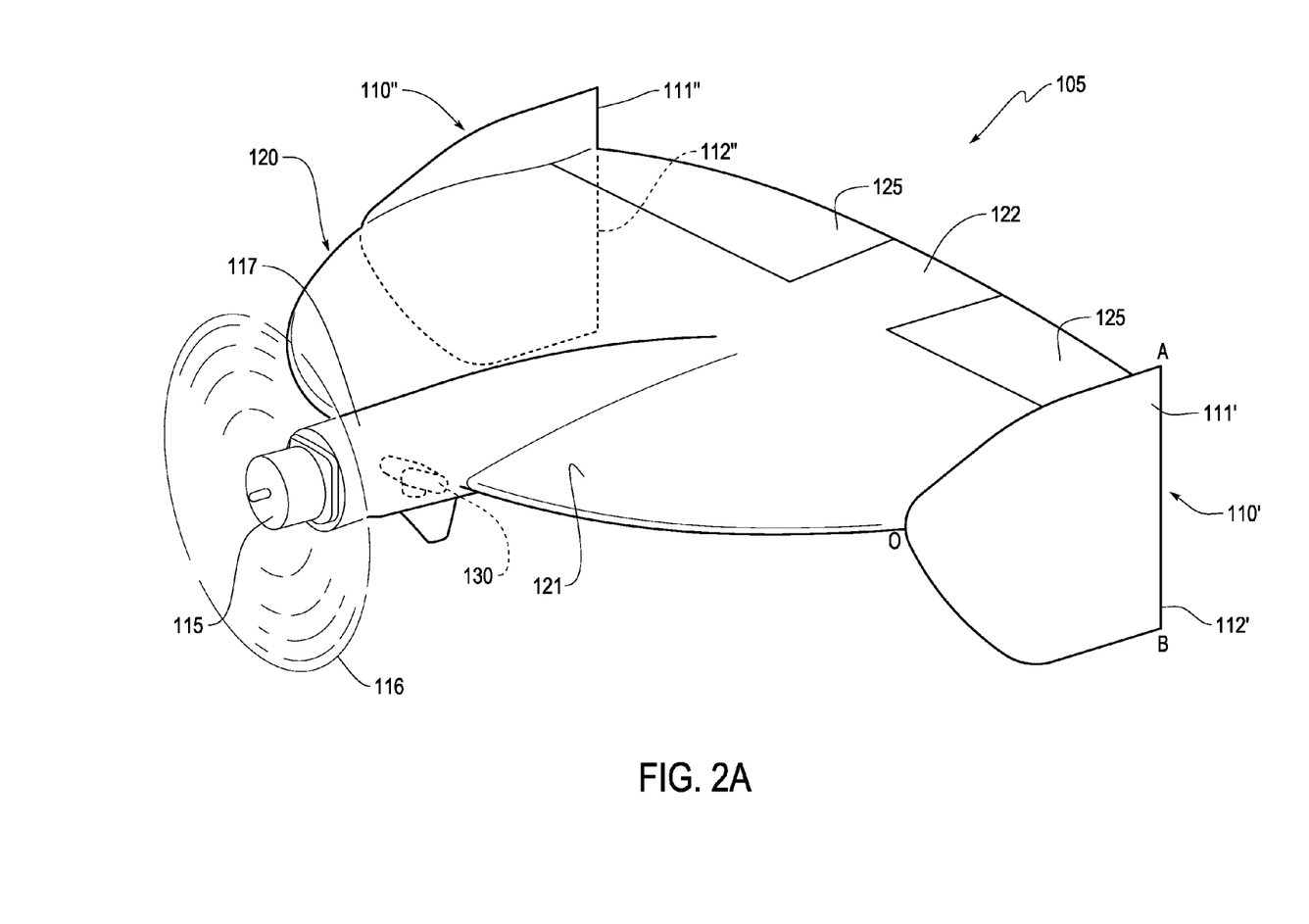
FIGS. 2A to 2C are perspective illustrations of a MAV, presenting said MAV from its top side, according to an embodiment of the present invention.
Figure 2B:
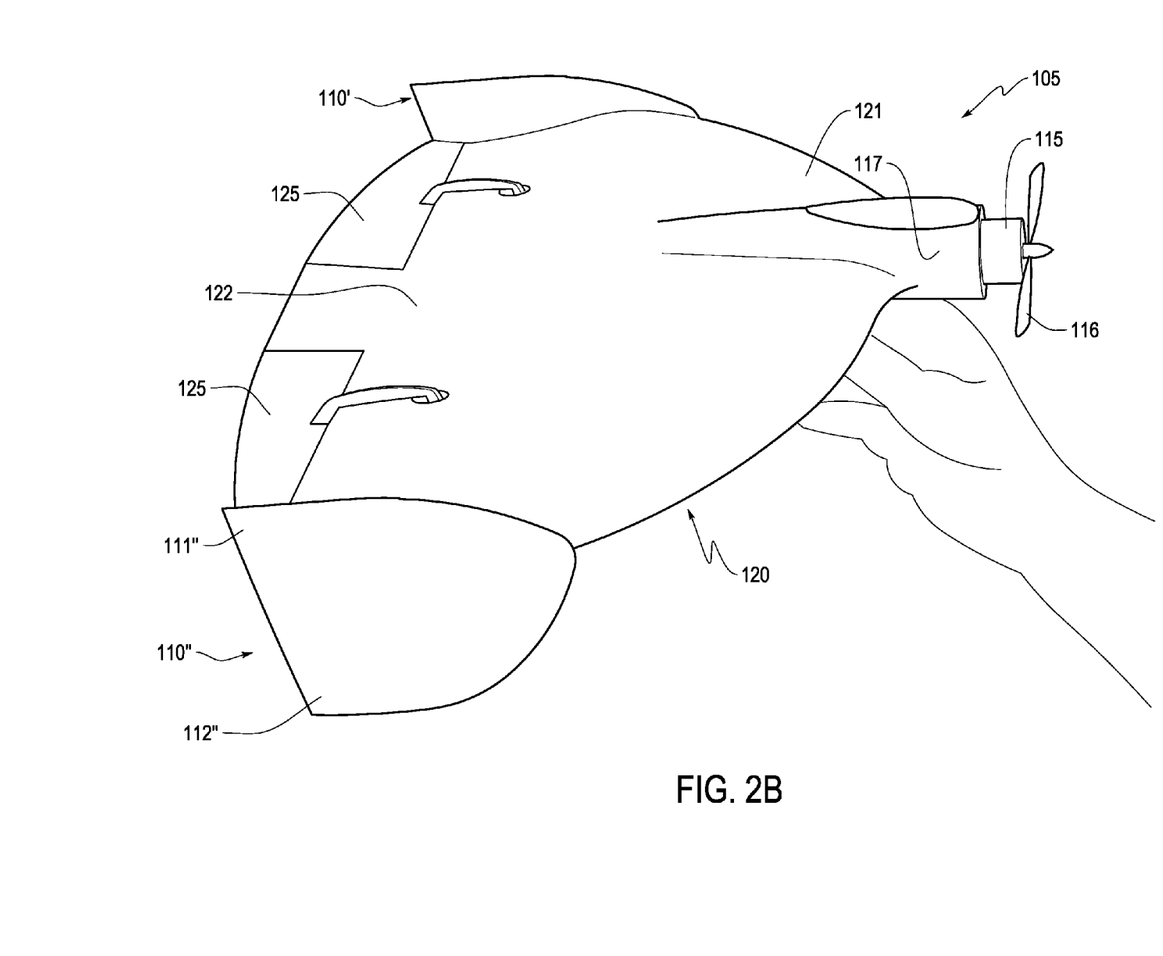
Figure 2C:
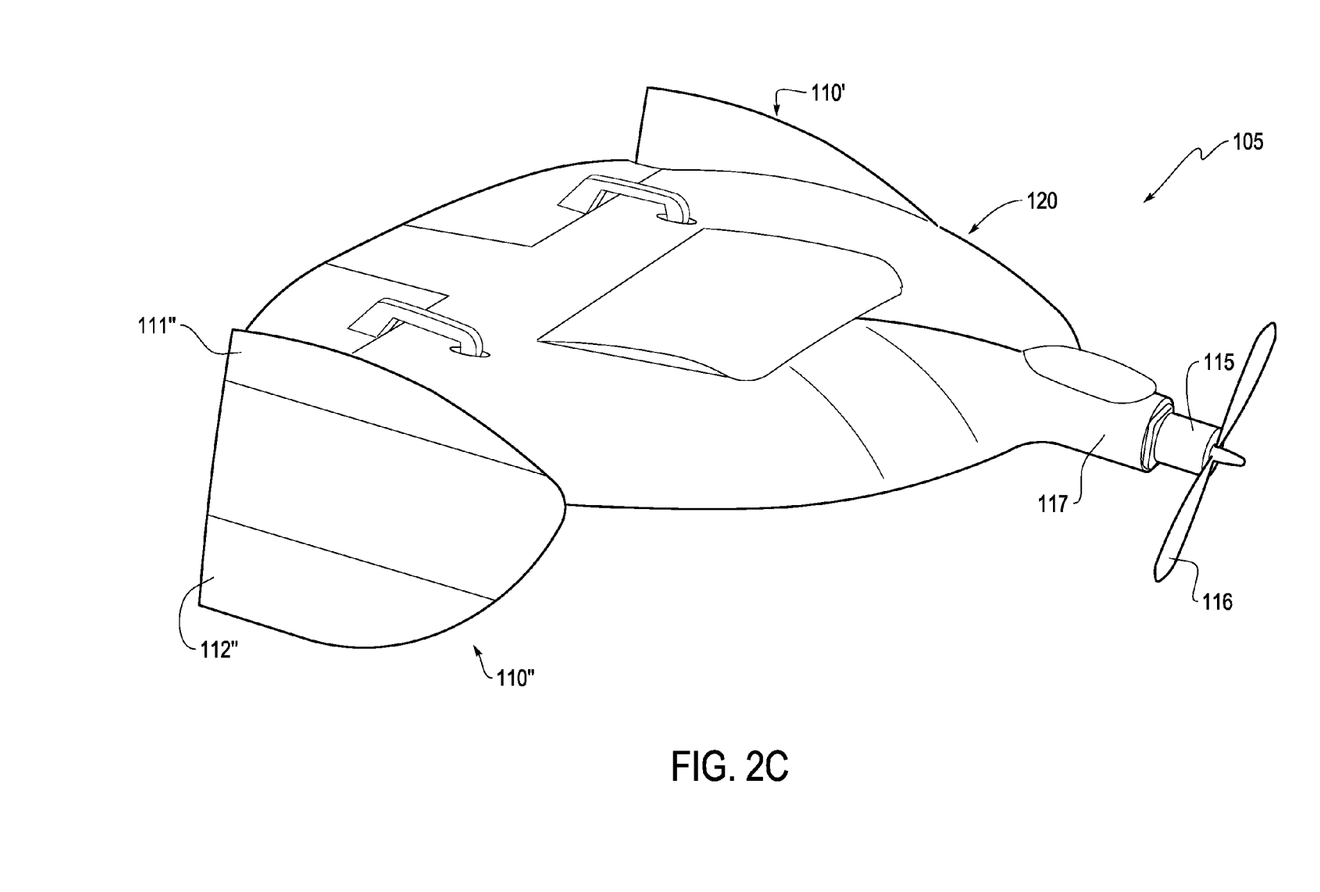
Figure 3:
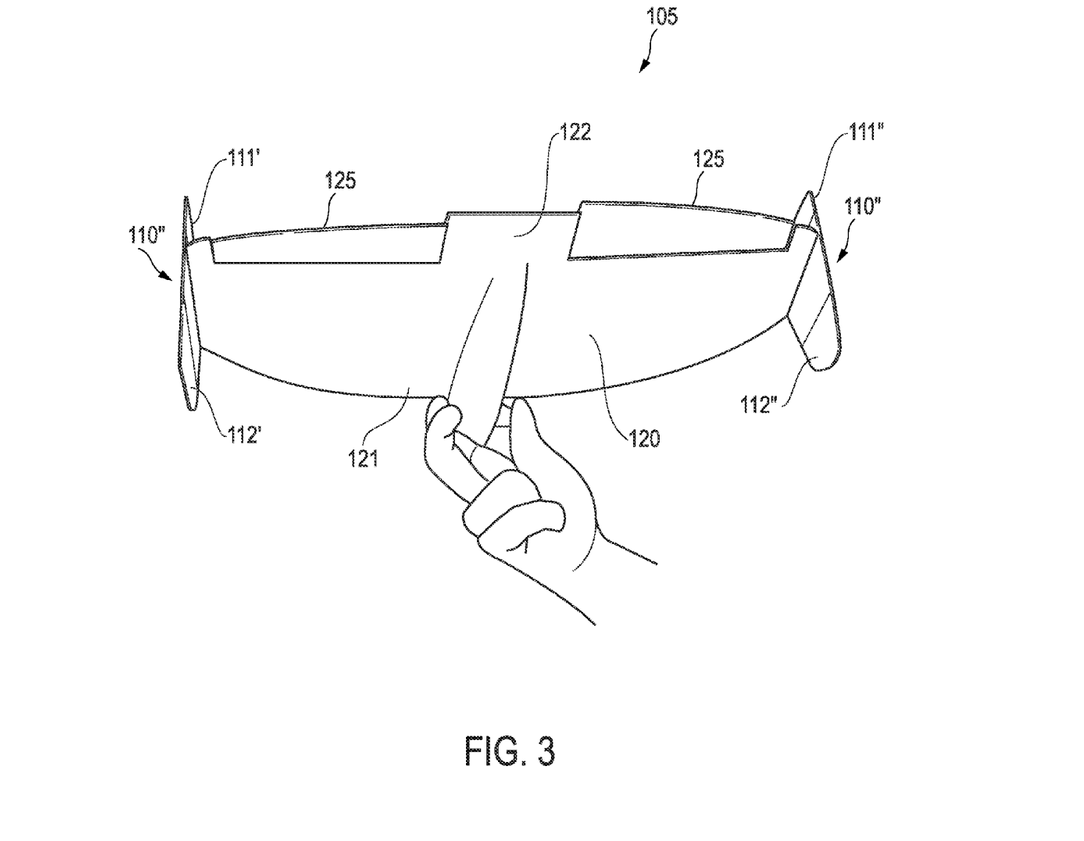
FIG. 3 is another perspective illustration of a MAV, presenting said MAV from its bottom side, according to an embodiment of the present invention.

FIGS. 2A to 2C are perspective illustrations of an unmanned air vehicle 105 (e.g., MAV), presenting said MAV 105 from its top side (surface), according to an embodiment of the present invention. Further, FIG. 3 is another perspective illustration of MAV 105, presenting said MAV 105 from its bottom side (surface), according to an embodiment of the present invention. MAV 105 comprises a body (e.g., flying wing) 120 having a front section 121 and a rear section 122; an end plate 110' connected to the left side of said body 120 and an end plate 110" connected to the right side of said body 120 for stabilizing said MAV 105 during the flight; a propulsion system 115 connected to front section 121 of said body 120, said propulsion system comprising a propeller 116 and an engine 117; a photo/video (on-board) camera 130 for enabling said MAV 105 to shoot video scenes and/or to take photos during the flight; one or more electronics circuits/units (not shown), placed within MAV body 120, comprising: a control unit for controlling operation of said MAV 105 and enabling it to shoot video scenes and/or to take photos during the flight, and a data transceiver for remotely communicating with a control center located, for example, on the ground; a power system (not shown), placed within body 120, which comprises for example, one or more batteries/accumulators for providing the required power supply to all electrical units and components of said MAV 105.

According to an embodiment of the present invention, end plates 110' and 110" are vertically connected to aircraft body 120, and each end plate has a shape composed of parabolic sections (e.g., Zimmerman, Inverse Zimmerman, etc.). The arc AOB of each end plate has a parabolic-like shape, and the base AB of each end plate is straight. It should be noted that end plates can be fabricated from a composite material, such as Kevlar laminates or Carbon laminates and laminate plates made of carbon and Kevlar sheets, and each end plate can be substantially flat.

It should be further noted that according to an embodiment of the present invention, due to providing end plates 110' and 110", the induced drag force on MAV 105, during its flight, is reduced, and MAV 105 stability is achieved.

According to an embodiment of the present invention, each end plate 110' (and 110") has an upper section 111' (111") and a lower section 112' (112"). It should be noted that the upper section area 111' (111") can be defined as the area (of each end plate) located above the MAV mean line (not shown), and similarly, the lower section area 112' (112") can be defined as the area located below the MAV mean line. It should be noted that the mean line passes along MAV body 120 (from MAV front section 121 to MAV rear section 122, inclusively), and stays equidistant from the top and bottom surfaces (sides) of said MAV body 120.

According to an embodiment of the present invention, each end plate is connected to aircraft body 120 such that the area of said upper section, which is located above the MAV mean line, is smaller than the area of said lower section, which is located below the MAV mean line. For example, the upper section area can be about 15% of the whole end plate area, and the lower section area can be the remaining 85%. According to an embodiment of the present invention, a ratio between the upper section area and the lower section area is less than 1, and can be, for example, 15/85=0.176 (about 0.18). According to another embodiment of the present invention, it should be noted that said ratio can vary, for example, between 0.05 and 0.55. For another example, the length of a portion of the base AB, which (said portion) is located above the MAV mean line, can be 15% of the overall AB base length, and similarly, the length of a portion of the base AB, which (said portion) is located below the MAV mean line can be the remaining 85%.

It should be noted that according to an embodiment of the present invention, end plates 110' and 110" stabilize MAV 105 along its all axes (yaw, roll and pitch axes), and especially along its yaw and roll axes.

According to another embodiment of the present invention, at rear section 122 of MAV body 120, are located two aerodynamic control panels 125. Such panels 125 can be connected to the control unit (not shown) of MAV 105, and be simultaneously deflected up by means of said control unit for generating an incremental lift force without changing an orientation of MAV 105. This enables said MAV 105 to maneuver in the air in a more proper manner during the flight. By deflecting said aerodynamic control panels 125 during the flight, the MAV 105 flight directions, and also lift and drag forces applied to said MAV 105 are controlled. Control panels 125 work in pairs as explained in the following. Simultaneously deflecting up these control panels 125 causes pitch up of the aircraft, while simultaneously deflecting down said control panels 125 causes pitch down of the aircraft, enforcing the aircraft speed and attitude to be changed. It should be noted that pitching up can be also used for flare during the last phase of landing. In order to roll the aircraft, and thus cause the aircraft to turn (or bank) right or left, each of the aerodynamic control panels 125 is deflected in the opposite direction relative to another: when one control panel is deflected up, another is simultaneously deflected down. For example, in order to bank left, the left aerodynamic control panel is deflected up and the right aerodynamic control panel is deflected down.

According to still another embodiment of the present invention, end plates 110' and 110" can have any other form, such as rectangular, square, elliptical, triangular, trapezoidal, etc. Further, each of end plates can be tilted relative MAV body 120: for example, tilted (for a predefined number of degrees) around MAV 105 roll axis. According to a further embodiment of the present invention, one or more additional end plates can be located at each side of MAV 105. Further, one or more end plates can be connected to the rear section 122 of MAV body 120.

It should be noted that photo/video camera 130 can be of any type, such as optical (having, for example, CCD (Charged Coupled Device) or CMOS (Complementary Metal-Oxide Semiconductor) imaging sensor), IR (Infrared)/thermal, near-infrared, ultraviolet or any other camera (or any combination thereof).

According to an embodiment of the present invention, MAV body 120 has a form of a flying wing (is tailless), and has an Inverse Zimmermann shape, for example. According to another embodiment of the present invention, MAV body 120 has an airfoil shape for generating a lift force for MAV 105.

It should be noted that the weight of MAV 105 can be, for example, 400 grams. Further, MAV 115 may have, for example, a length of 35.2 cm (along with propulsion system 115) and a width (wingspan) of also 35 cm. In addition, the length of each end plate can be 13 cm and the width (the length of the AB section)—10.5 cm. Also, the thickness of said aircraft body 120 at its front section 121 can be 4 cm, and the thickness of said aircraft body at its rear section 122 can be less than 0.2 cm: e.g., the thickness can be gradually decreased from said front section 121 toward said rear section 122. A radius of propeller 116 can be, for example, 7 cm, and the continuous flight time of MAV 105 can be about 40 minutes.

According to an embodiment of the present invention, due to providing end plates 110' and 110", MAV 105 has improved aerodynamic configuration and can fly in the air in a relatively stable manner along its all axes (yaw, roll and pitch), and especially along its yaw and roll (longitudinal) axes. Further, end plates 110' and 110" are relatively light in weight, which in turn almost does not influence an overall MAV weight.

According to another embodiment of the present invention, vibrations and oscillations along MAV roll and yaw axes (e.g., when the MAV speed increases) are overcome by substantially preventing, by means of end plates 110' and 110", the airflow from a bottom side of MAV 105 body to a top side of said MAV body. In turn, shooting relatively stable video scenes and taking relatively stable photos, by means of video/photo on-board camera 130 during the MAV flight, is enabled.

According to an embodiment of the present invention, MAV 105 due to utilizing end plates 110' and 110" is relatively stable and has improved lift and maneuver capabilities. Further, MAV 105 has an enhanced aerodynamic configuration and enhanced aerodynamic self-recovery at stalls (the stall is a sudden reduction in the lift force generated by airfoil body 120), that in turn guarantees a safe flight in gusty air.

According to another embodiment of the present invention, end plates 110' and 110" produce the effect of increased effective aspect ratio (AR), leading to a decrease in the induced drag force and improving MAV aerodynamic quality. In turn, the reduced level of the induced drag force and improved values of the lift force help to achieve the optimum flight range and endurance performance at increased values of lift coefficients, complying at the same time, with required speed safety margins. It should be noted that the aspect ratio of MAV 105 can be, for example, within the range of 1.4 to 2.

It should be noted that according to an embodiment of the present invention, the power supply system can comprise one or more solar cells for accumulating solar energy and converting such energy to electrical power to be supplied to one or more electrical units and components of said MAV 105.

In addition, it should be noted that unmanned air vehicle 105 can be a micro air vehicle, mini air vehicle, nano air vehicle and the like.

Figure 4A:
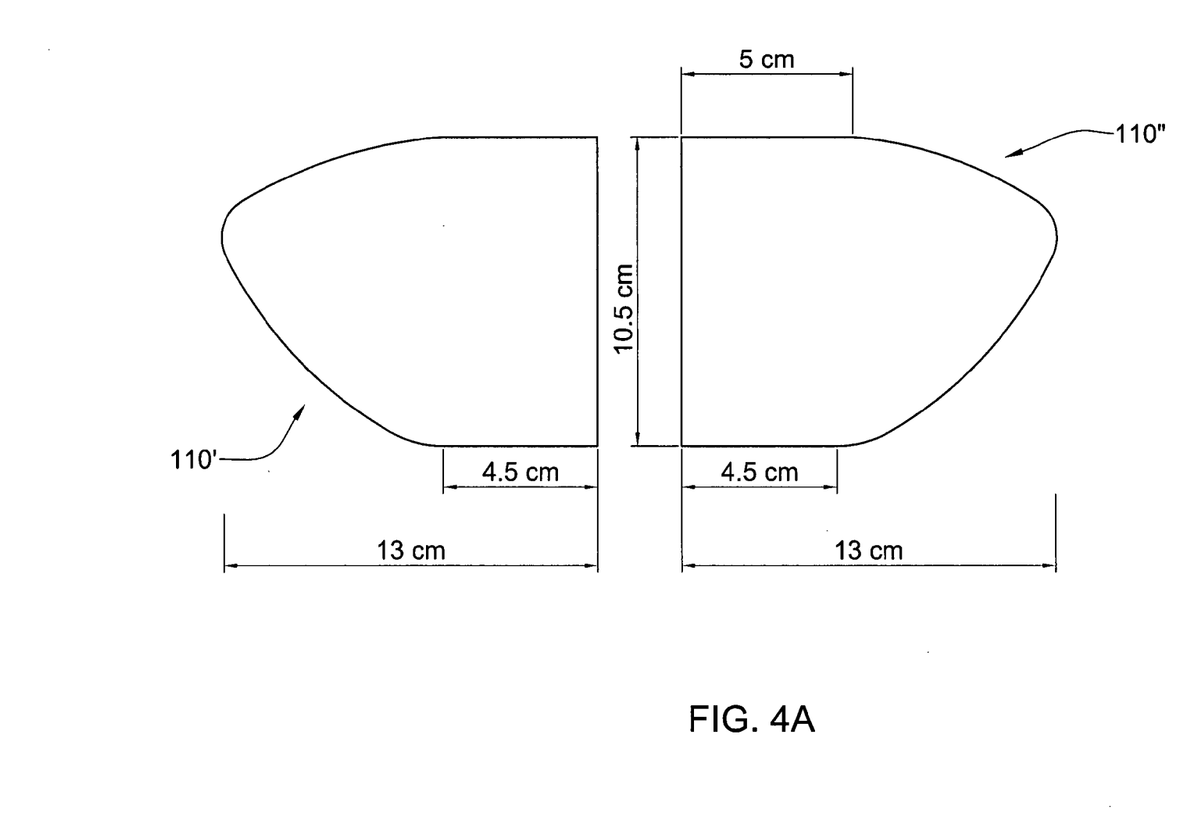
FIG. 4A is a schematic illustration of end plates of a MAV, according to an embodiment of the present invention.
Figure 4B:
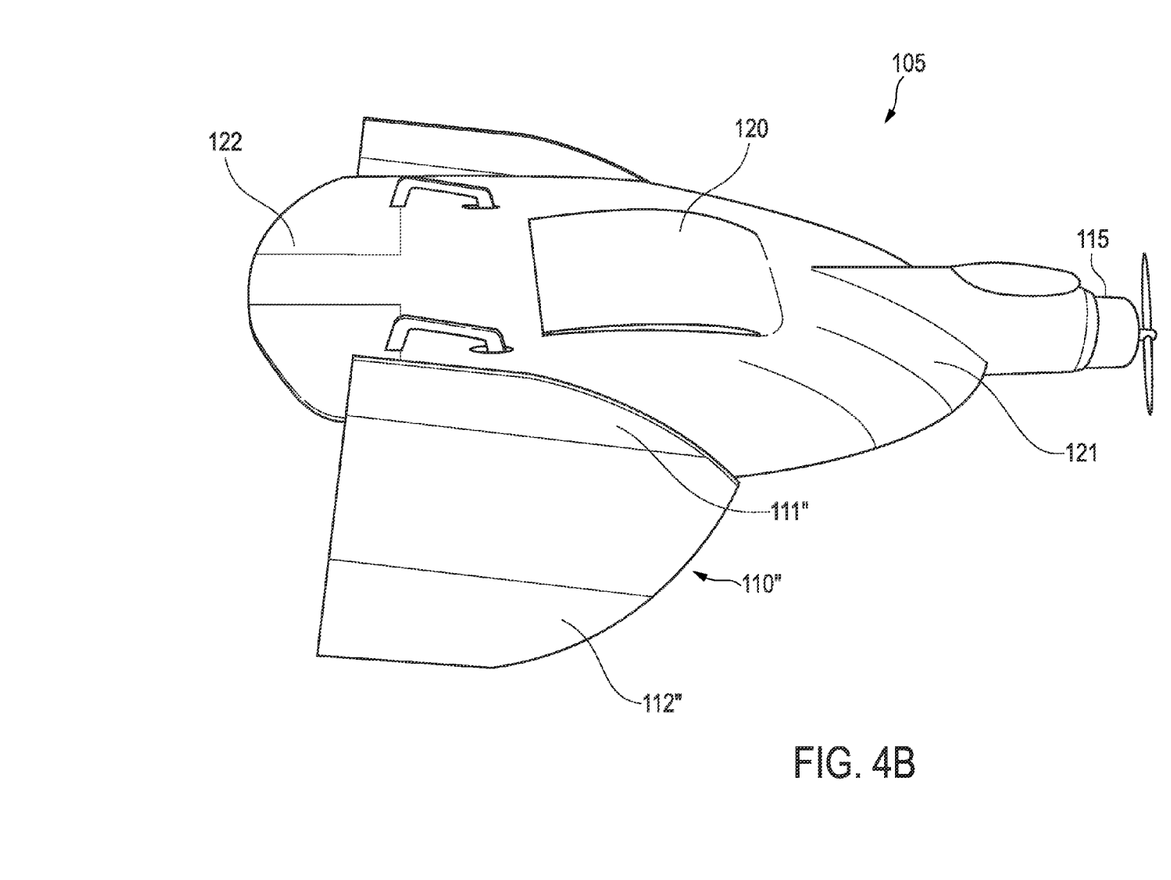
FIG. 4B is another illustration of an end plate of a MAV, according to an embodiment of the present invention.

FIG. 4A is a schematic illustration of end plates 110' and 110" of MAV 105, according to an embodiment of the present invention. Further, FIG. 4B is another illustration of end plate 110" of MAV 105, according to an embodiment of the present invention. According to an embodiment of the present invention, each end plate 110' (and 110") has an upper section 111' (111") and a lower section 112' (112"). It should be noted that the upper section area 111' (111") can be defined as the area (of each end plate) located above the MAV mean line (not shown), and similarly, the lower section area 112' (112") can be defined as the area located below the MAV mean line.

According to an embodiment of the present invention, each end plate is connected to aircraft body 120 such that the area of said upper section, which is located above the MAV mean line, is smaller than the area of said lower section, which is located below the MAV mean line. For example, the upper section area can be about 15% of the whole end plate area, and the lower section area can be the remaining 85%. According to an embodiment of the present invention, a ratio between the upper section area and the lower section area is less than 1, and can be, for example, 15/85 (about 0.18). According to another embodiment of the present invention, it should be noted that said ratio can vary, for example, between 0.05 and 0.55. For another example, the length of a portion of the base AB, which (said portion) is located above the mean line of aircraft body 120, can be 15% of the overall AB base length, and similarly, the length of a portion of the base AB, which (said portion) is located below the mean line of said aircraft body 120 can be the remaining 85%.

It should be noted that according to an embodiment of the present invention, end plate 110" is similar to end plate 110' and is its mirror projection.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. An unmanned air vehicle, comprising a body having front and rear sections with at least one pair of end plates connected to said body, wherein one end plate within said at least one pair of end plates is connected to the left side of said body and another end plate within said at least one pair of end plates is connected to the right side of said body, each end plate having upper and lower sections, wherein:
   a) said upper section is positioned above a mean line of said body;
   b) said lower section is positioned below said mean line of said body; and c) a ratio of the area of said upper section to the area of said lower section is less than 1,
and wherein the unmanned air vehicle is selected from one of the following:
i) a micro air vehicle;
ii) a mini air vehicle; and
iii) a nano air vehicle.

2. The unmanned air vehicle according to claim 1, wherein the ratio is substantially less than 1.

3. The unmanned air vehicle according to claim 1, wherein the ratio is between 0.05 and 0.55.

4. The unmanned air vehicle according to claim 1, wherein the ratio is 0.176.

5. The unmanned air vehicle according to claim 1, wherein the end plates stabilize said unmanned air vehicle along its roll axis.

6. The unmanned air vehicle according to claim 1, wherein the end plates stabilize said unmanned air vehicle along its yaw axis.

7. The unmanned air vehicle according to claim 1, wherein each of the one end plate and the another end plate has one of the following forms, or a combination thereof:
a) inverse Zimmerman;
b) Zimmerman;
c) rectangular;
d) square;
e) elliptical;
f) trapezoidal;
g) triangular; and
h) parabolic.

8. The unmanned air vehicle according to claim 1, wherein each end plate is substantially vertically connected to the body.

9. The unmanned air vehicle according to claim 1, wherein each end plate is tilted relative to the body.

10. The unmanned air vehicle according to claim 1, wherein the body of said unmanned air vehicle has a form of a flying wing.

11. The unmanned air vehicle according to claim 1, wherein the body has an airfoil shape.

12. The unmanned air vehicle according to claim 1, wherein said unmanned air vehicle is tailless.

13. The unmanned air vehicle according to claim 1, wherein the thickness of the body decreases from its front section toward its rear section.

14. The unmanned air vehicle according to claim 1, wherein a propulsion system is provided at the front section of the body.

15. The unmanned air vehicle according to claim 1, further comprising a photo and/or video camera.

16. The unmanned air vehicle according to claim 15, wherein the camera is one or more of the following:
a) an optical camera;
b) an infrared or near-infrared camera; and
c) an ultraviolet camera.

17. The unmanned air vehicle according to claim 1, further comprising one or more control panels.

18. The unmanned air vehicle according to claim 17, wherein the one or more control panels are located at the rear section of the body of said unmanned air vehicle.

19. The unmanned air vehicle according to claim 17, wherein the one or more control panels are simultaneously deflected by means of a control unit.

20. The unmanned air vehicle according to claim 19, wherein two or more control panels are simultaneously deflected up or down.

21. The unmanned air vehicle according to claim 19, wherein the one control panel is deflected up simultaneously when another control panel is deflected down.

22. The unmanned air vehicle according to claim 1, wherein at least one of the one end plate and the another end plate is connected to the rear section of the body of said unmanned air vehicle.

23. The unmanned air vehicle according to claim 1, further comprising a control unit for controlling operation of said unmanned air vehicle.

24. The unmanned air vehicle according to claim 1, further comprising a power system having one or more batteries or accumulators.

25. An unmanned air vehicle, comprising a body having front and rear sections with at least one pair of end plates connected to said body, wherein one end plate within said at least one pair of end plates is connected to the left side of said body and another end plate within said at least one pair of end plates is connected to the right side of said body, each end plate having upper and lower sections, wherein:
a) said upper section is positioned above a mean line of said body;
b) said lower section is positioned below said mean line of said body; and
c) a ratio of the area of said upper section to the area of said lower section is less than 1,
and wherein the body of said unmanned air vehicle has a form of a flying wing.

26. The unmanned air vehicle according to claim 25, wherein the ratio is one of:
i) substantially less than 1;
ii) between 0.05 and 0.55; and
iii) 0.176.

27. The unmanned air vehicle according to claim 25, wherein the end plates stabilize said unmanned air vehicle along one of the air vehicle roll axis and the air vehicle yaw axis.

28. The unmanned air vehicle according to claim 25, wherein each of the one end plate and the another end plate has one of the following forms, or a combination thereof:
a) inverse Zimmerman;
b) Zimmerman;
c) rectangular;
d) square;
e) elliptical;
f) trapezoidal;
g) triangular; and
h) parabolic.

29. The unmanned air vehicle according to claim 25, wherein
each end plate is one of substantially vertically connected to the body and tilted relative to the body.

30. The unmanned air vehicle according to claim 25, wherein
the body has an airfoil shape.

31. The unmanned air vehicle according to claim 25, wherein
said unmanned air vehicle is tailless.

32. The unmanned air vehicle according to claim 25, wherein
the thickness of the body decreases from its front section toward its rear section.

33. The unmanned air vehicle according to claim 25, wherein
at least one of the one end plate and the another end plate is connected to the rear section of the body of said unmanned air vehicle.

34. The unmanned air vehicle according to claim 25, further comprising one or more of:
one or more control panels;
one or more control panels located at the rear section of the body of said unmanned air vehicle;
one or more control panels simultaneously deflected by means of a control unit;
two or more control panels simultaneously deflected up or down;
two or more control panels wherein one control panel is deflected up simultaneously when another control panel is deflected down;
a propulsion system provided at the front section of the body;
a control unit for controlling operation of said unmanned air vehicle;
a power system having one or more batteries or accumulators;
a photo and/or video camera; and
a photo and/or video camera being any one of: an optical camera, an infrared camera, a near-infrared camera, and an ultraviolet camera.

* * * * *